H. W. BLAKE.
BRAKE MECHANISM FOR CAR TRUCKS.
APPLICATION FILED NOV. 23, 1909.
976,844.
Patented Nov. 29, 1910.
3 SHEETS—SHEET 1.
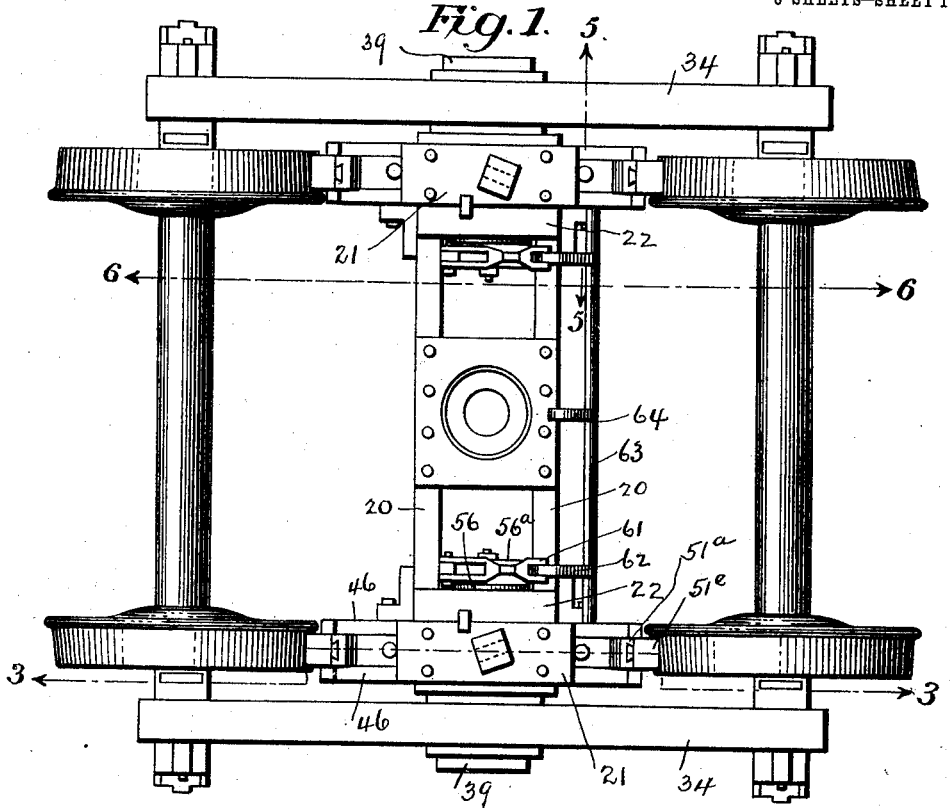
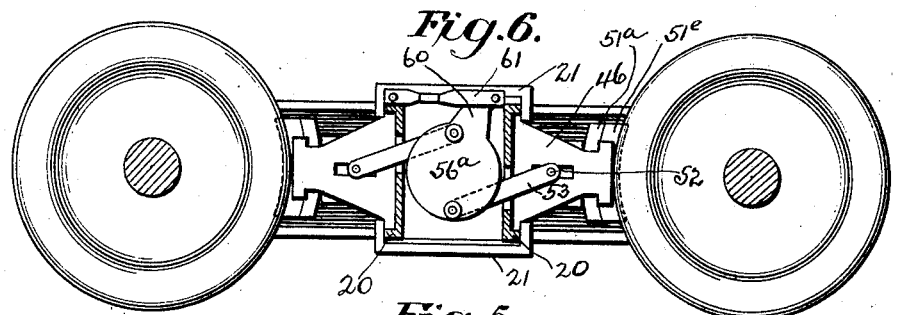
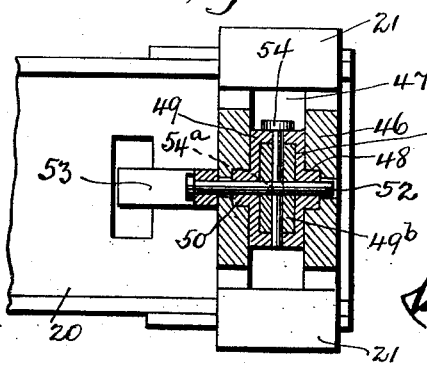
Witnesses
Inventor
H. W. Blake

H. W. BLAKE.
BRAKE MECHANISM FOR CAR TRUCKS.
APPLICATION FILED NOV. 23, 1909.

976,844.

Patented Nov. 29, 1910
3 SHEETS—SHEET 2.

Witnesses

Inventor
H. W. Blake

Attorneys

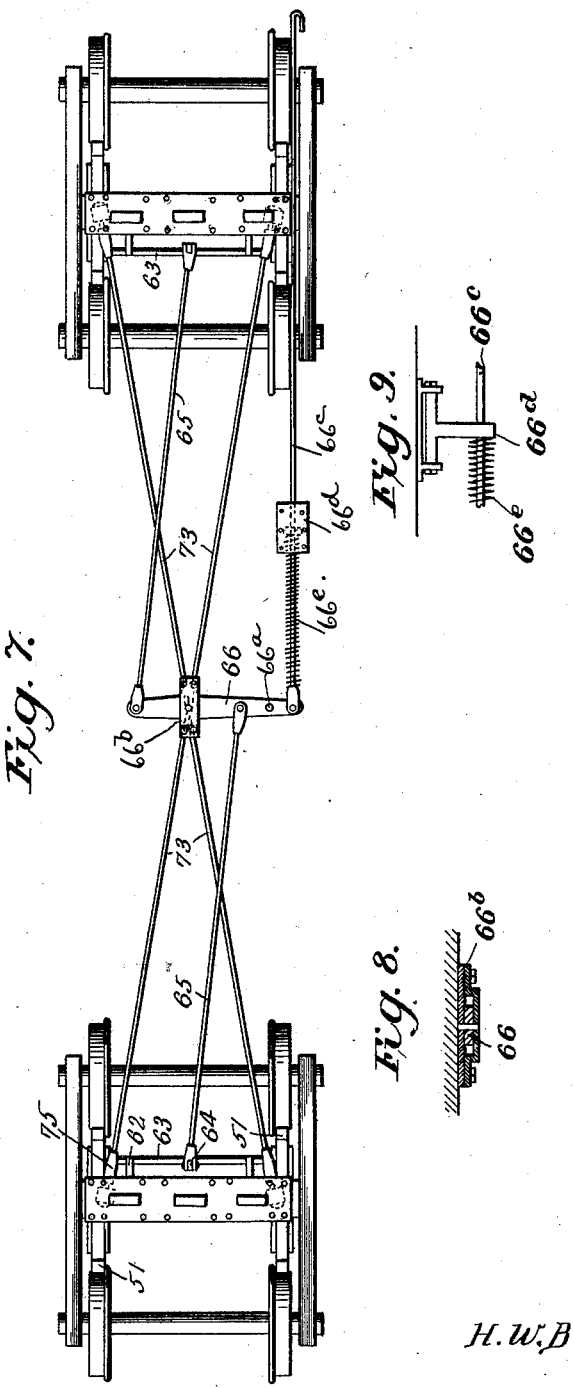

UNITED STATES PATENT OFFICE.

HENRY W. BLAKE, OF BALL GROUND, GEORGIA.

BRAKE MECHANISM FOR CAR-TRUCKS.

976,844.  Specification of Letters Patent.  Patented Nov. 29, 1910.

Application filed November 23, 1909. Serial No. 529,650.

*To all whom it may concern:*

Be it known that I, HENRY W. BLAKE, a citizen of the United States, residing at Ball Ground, in the county of Cherokee and State of Georgia, have invented new and useful Improvements in Brake Mechanism for Car-Trucks, of which the following is a specification.

My invention relates to improvements in brake mechanism for railway cars.

Among the objects of my invention are the following: 1. To provide a mechanism in which the general movement of the brake-shoes into and out of setting position is limited to and positively guided in a single plane. 2. The mounting of the brake-shoe operating mechanism on a truck in such manner that the direction of movement of the shoes will be on a plane which normally corresponds with the plane of the axis of the wheel. 3. The provision of a limited pivotal movement of the brake shoe on its carrier, the movements being cushioned. 4. The supporting of the brake-shoe operating mechanism on a removable part of the truck, the removal of such part retaining the mechanism in normal position. 5. The provision of a rotatable rod connected to the brake-lever, said rod being operatively connected to a rotatable member mounted at each end of the bolster, each member being connected to a pair of brake-shoe carriers in such manner as to convert the rotary movement of the member to a reciprocating movement of the carriers. 6. To provide a brake mechanism having its setting operation at will or under certain conditions, and automatically returnable to inoperative position upon release of the conditions. 7. To provide a brake-shoe member having a recess the walls of the recess retaining the parts in position against separation.

To these and other ends, the nature of which will be readily understood as the invention is hereinafter disclosed, said invention consists in the improved construction and combination of parts hereinafter fully described, illustrated in the accompanying drawings, and particularly pointed out in the appended claims.

Figure 2:
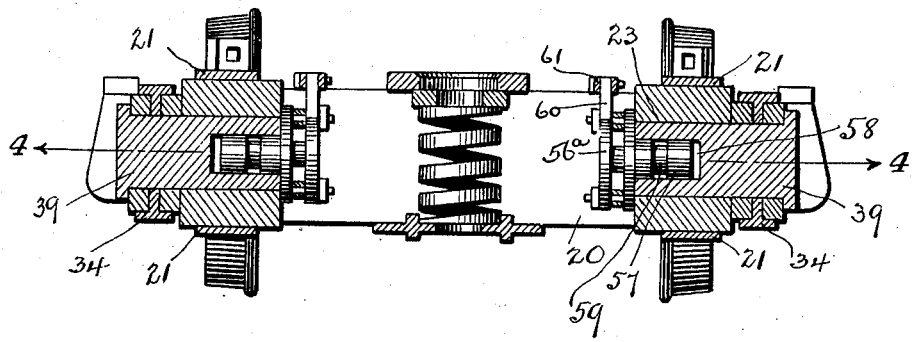
Figure 3:
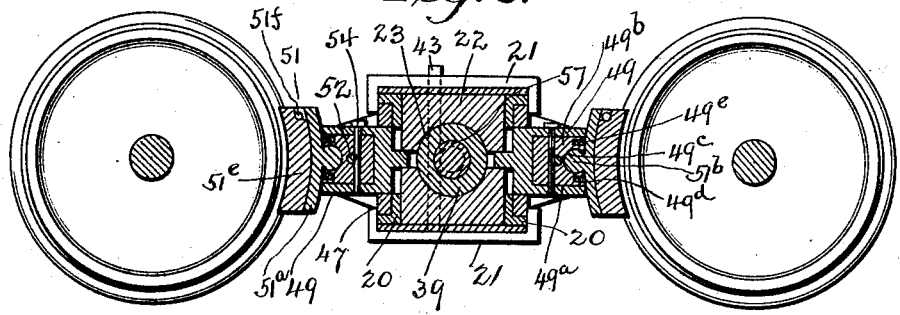
Figure 4:
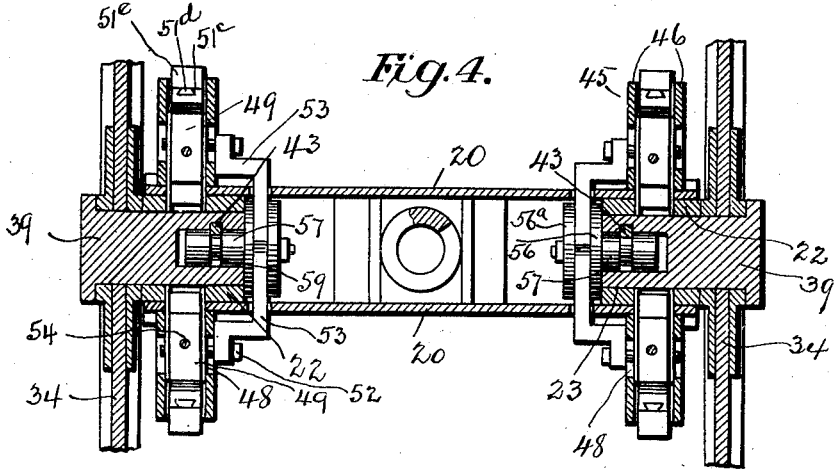

In the accompanying drawings, in which similar reference characters indicate similar parts in each of the several views,—Figure 1 is a plan view of a truck showing my improved brake mechanism applied thereto. Fig. 2 is a central, vertical, transverse sectional view of the same. Fig. 3 is a sectional view taken on line 3—3 of Fig. 1. Fig. 4 is a sectional view taken on line 4—4 of Fig. 2. Fig. 5 is a sectional view taken on line 5—5 of Fig. 1. Fig. 6 is a sectional view taken on line 6—6 of Fig. 1. Fig. 7 is a diagrammatic plan view of the trucks of a car and the connections between them, including the brake operating mechanism. Fig. 8 is a vertical, central, longitudinal sectional view of the brake-lever support in position on the frame of the car. Fig. 9 is a side elevation of the brake-rod bracket attached to the frame of the car and showing the hand-brake rod and its actuating spring.

The truck shown herein and consisting of the bolster, the side-frames, the connection between the side-frames and bolster, and the wheels, these parts being all removably connected together to permit of a ready separation of the parts, is not described in detail herein, as the same forms the subject-matter of my companion application filed November 23, 1909, Serial No. 529,649. So much thereof, however, as is required to indicate the particular construction, arrangement of parts, and positions thereof, of the brake-mechanism, is specifically described herein.

The bolster is formed of two-spaced apart parallel flanged plates 20 of a length substantially equal to the distance between the side frames 34, the ends of the plates being clamped together by clamps 21, the spacing being provided by blocks 22, each having an opening 23 to receive a connecting member presently described. This construction of bolster provides a vertically-extending opening within which is received certain of the parts of the brake-mechanism presently described.

The bolster and side frames are removably secured together by a connecting member 39 which is insertible through the side frame into and through the opening 23, said member having a recess or bearing 58 extending axially from the inner end of the member, into which recess is passed a pin 57 having an annular groove 59, said groove being adapted to permit of the passage of a pin 43 by means of which the parts are locked against separation, the pin 43 extending through the clamps 21, block 22 and the member 39, the groove permitting of a pivotal movement of the pin 57 and at the same time retaining said pin against axial movement.

The parts above described refer more particularly to the truck structure described and claimed in my companion application heretofore referred to, the same forming supports for various portions of the brake-mechanism now to be described.

45 designates a member formed of two plates 46 spaced apart but connected at one end, as at 47, said members being four in number, one of which is secured on each side of the bolster at its ends. The plates 46 are each recessed longitudinally to form opposing guide-ways 48 for the brake-shoe carriers 49, each of which is provided with oppositely projecting ribs 50 adapted to extend into said recesses, the ribs and recesses providing for a movement of the carriers in a single plane. Each carrier 49 is secured within the plates 46 by a pin 52 projecting through a slot formed in each plate 46, and through an arm 53 of the operating mechanism, said pin 52 being secured in suitable manner, as by a pin 54 extending vertically through the carrier 49 and passing through a recess 54$^a$ formed in the pin 52. As will be understood, the pin 52 serves to limit the movement of the carrier 49, the length of movement of such carriers being not greater than the length of the slots formed in the plates 46.

51 designates the brake-shoe structure and is preferably formed as indicated in Fig. 3 of the drawing. As indicated in said figure, each carrier 49 is recessed longitudinally, as at 49$^a$, the recess being adapted to receive a block 49$^b$ through which the pins 52 and 54 extend. The exposed face of said block is formed with an approximately semi-cylindrical opening 49$^c$ having its axis extending laterally of the carrier. The block is also provided with two recesses 49$^d$, one above and the other below the opening, said latter recesses being adapted to receive a spring 49$^e$ forming a cushion for the brake-shoe. While I have shown but a single spring as the cushion member, it will be understood that the number may be varied to meet the conditions which may be present in use. Although I have described the opening 49$^c$ as approximately semi-cylindrical, it is to be understood that the open side of the opening is of a length less than the diameter of the opening, thereby providing a partially inclosed opening within which one member, designated as 51$^a$, of the brake-shoe is mounted, said member having a rounded head 51$^b$ which is received within the opening by a relative movement of the block and member in directions axially of the opening, the assembling of the parts being had prior to the insertion of the block within its recess, the axial length of the head 51$^b$ corresponding to the axial length of the opening. This particular form of mounting permits of a limited pivotal movement of the member 51$^a$ with the head as the pivot, the movements being cushioned by the springs 49$^e$ which are adapted to abut against the face of member 51$^a$.

The member 51$^a$ is preferably curved as indicated and is provided on its outer face with a dove-tail groove 51$^c$ terminating short of the bottom of the member and adapted to receive a complemental tongue 51$^d$ formed on the member 51$^e$ which provides the actual wheel-contacting portion of the brake-shoe. The tongue and groove connection of the brake-shoe members is of any desired form, I preferring, however, to have the direction of vertical length to extend in approximate parallelism with the wheel-contacting face of the member 51$^e$, thereby providing a member which is of substantially equal wearing depth throughout the member and permitting the member to be retained in use until the face of member 51$^a$ is practically reached without affecting the connection of the parts, the connection being located entirely within the body of the member 51$^a$. The member 51$^e$ is secured in position by any form of fastening device, that shown in the drawings being in the form of a pin 51$^f$ extending through the member 51$^a$ above the upper edge of the tongue of member 51$^e$. By this construction it will be readily understood that the brake-shoe can accommodate itself to the relative movements of the wheels and truck-frame in a vertical direction (the normal planes of the guide-ways 48 and opening 49$^c$ being approximately the plane of the axis of the wheels), but the tendency of the parts to move under frictional engagement of shoes and wheels is resisted by the structure of the shoe and carrier and the connection of the latter to the truck, this structure providing the equivalent in strength of an integral brake-shoe support, but having adjustability to meet conditions without affecting this strength.

The reciprocating movements of the carriers 49 are provided by the arms 53 pivotally mounted between disks 56 and 56$^a$, said disks being fixedly mounted on the pin 57 the outer end of which extends into the bearing 58 formed in the inner end of the member 39, said pin having the annular groove 59 to permit of the passage of the pin 43, as heretofore described, said groove and pin locking the pin 57 against axial movement when the parts are assembled. As will be seen there is provided a pair of disks 56 and 56$^a$ at each end of the bolster, said disks being located between the plates 20, each pair being adapted to receive the arms 53 for the two brake-shoe carriers at the respective ends of the bolster. Said arms 53 extend through the plates 20 from opposite sides of the bolster, and each has its inner end mounted between the disks at a point spaced from the center of the disk, the pair of arms at each end extending on diametrically opposite sides of the center of the disks.

Inasmuch as the disks are pivotally mounted within the bearing formed by the member 39, it will be readily understood that if a pivotal or rotary movement be given to the disks, such movement will cause the arms 53 to be given a substantially reciprocating movement at their outer ends, and as such outer ends are connected to the brake shoe carriers, a corresponding movement will be given to the carriers. To provide the pivotal movements of the disks, I provide one of each pair (preferably the inner one) with an arm 60 to the outer end of which is pivotally connected a connecting lever 61, the opposite end of which is connected to a lever or arm 62 carried by a rod 63 pivoted within the plates 46, said levers or arms 62 being preferably curved or formed angular in the direction of their length to provide a compact structure. The rod 63 is moved pivotally by means of a lever 64, the free end of which is connected to the brake rod 65, which, in turn, is connected to a lever 66 pivotally mounted in a brake-lever-support 66$^b$ secured to the car, the lever 66 being operatively connected to the brake actuating mechanism, such as an air brake mechanism (the opening 66$^a$ being shown to receive the connection) or a hand brake mechanism, or both, as may be desired, the hand brake mechanism being shown as a rod 66$^c$ connected to the brake lever and supported from the car body by a bracket 66$^d$, a spring 66$^e$ being interposed between the bracket and lever to normally retain the brakes unset.

From the above, it will be understood that if the rod 63 be moved pivotally in one direction, the carriers 49 will be caused to move outwardly to place the brake shoes in contact with the wheels, while if moved in the opposite direction, the shoes will be withdrawn from such contact, but in each case, the movements of the shoes are confined to movements in a single plane, and owing to the location of the guides, the shoes exert their pressure in opposite directions in a line corresponding to the horizontal plane of the axles of the truck, thereby providing an efficient braking effect. It will also be understood that by reason of the mounting of the carrier 49 and its limited movement, the loss of a brake shoe in any manner will not permit the carrier to pass into contact with the tread of the car wheel; hence, wear and breakage of parts other than the shoe itself, is entirely eliminated. Furthermore, it will be understood that inasmuch as the disks are supported solely by the member 39 the weight placed on the bolster will not extend to the brake operating mechanism to any material extent, thereby practically eliminating liability of the operating mechanism being rendered inoperative by the action of the car or bolster, and permitting of the use of relatively light material for this mechanism. It is to be understood that wherever found necessary cotter pins will be made use of for the purpose of retaining pins and other removable parts in position and against separation.

As will be seen the pivot point of the lever 66 is located intermediate the point of connection of the several rods 65 with said lever 66. By this means a positive movement is provided for both rods 65 in both directions, the movements while simultaneous, being in effect independent or disconnected, so that should one of the rods become disabled, the other rod will remain in service, thereby providing for a brake operation of the trucks of the car as long as there remains a single brake-shoe in condition for operation on the car-wheel, and connected up through the mechanism described herein to the lever 66. Furthermore, it is to be understood that, where necessary, parts will be riveted together to retain them in permanent engagement.

What I claim is:

1. In a truck, a bolster, brake shoe carriers removably carried by the bolster and movable in a single plane extending substantially midway of the top and bottom planes of the bolster, and a brake operating mechanism for imparting reciprocating movement to said carriers.

2. In a truck, a bolster, side frames, connecting members for the side frames and bolster, brake-shoe carriers removably supported on the bolster, and brake operating mechanism removably supported within said members, said operating mechanism imparting reciprocating movement to said carriers.

3. In a truck, a bolster, reciprocating brake-shoe carriers mounted on the bolster, rotatable means for operatively connecting and reciprocating in either direction said carriers in pairs, and a support for the means for each pair.

4. In a truck, a bolster, side frames, connecting members for the side frames and bolster, brake-shoe carriers supported by the bolster, and operating mechanism for said carriers, said mechanism being removably secured to said members, the securing of the mechanism locking the bolster and side frames against separation.

5. In a truck, a bolster, side frames, connecting members for the side frames and bolster, brake-shoe carriers supported by the bolster, and operating mechanism for said carriers, said mechanism being removably secured to said members, the securing of the mechanism locking the bolster and side frames against separation, said mechanism including a pivotally mounted element for each pair of carriers, connections between said element and its pair of carriers, and means for simultaneously imparting movements to all of the elements.

6. In a truck, a bolster, reciprocating brake-shoe carriers supported by said bolster substantially midway of the height of the bolster, means for imparting reciprocating movements to each pair of carriers, and a single means for operating all of the pair operating means simultaneously.

7. In a truck, a bolster, reciprocating brake-shoe carriers supported by said bolster substantially midway of the height of the bolster, means for imparting reciprocating movements to each pair of carriers, and a single means for operating all of the pair operating means simultaneously, said latter means including a brake-lever normally retained in inoperative position, by a spring.

8. In a truck, a brake-shoe carrier, a block removably secured within the carrier, said block having a lateral opening, a member having a head extending within said opening and movable pivotally therein, and a brake shoe removably secured to said member.

9. In a truck, a brake-shoe carrier, a block removably secured within the carrier, said block having a lateral opening, a member having a head extending within said opening and movable pivotally therein, and a brake-shoe removably secured to said member, said brake-shoe being of substantially equal wearing depth throughout its length.

10. In a truck, a brake-shoe carrier, a block removably secured within the carrier, said block having a lateral opening, a member having a head extending within said opening and movable pivotally therein, and a brake-shoe removably secured to said member, said brake-shoe being of substantially equal wearing depth throughout its length, the member and shoe having complemental connecting means positioned to prevent restriction of the wearing depth of the shoe.

11. In a truck, a brake-shoe carrier, a block removably secured within the carrier, said block having a lateral opening, a member having a head extending within said opening and movable pivotally therein, and a brake shoe removably secured to said member, said brake-shoe being of substantially equal wearing depth throughout its length, the member and shoe having a complemental tongue and groove connection located entirely within the body of the member.

12. In a truck, a brake-shoe carrier, a block removably secured within the carrier, said block having a lateral opening, a member having a head extending within said opening and movable pivotally therein, and a brake-shoe removably secured to said member, the pivotal movements of the shoe being cushioned.

13. In a truck, a brake shoe carrier, a block removably secured within the carrier, said block having a lateral opening, a member having a head extending within said opening and movable pivotally therein, a brake-shoe removably secured to said member, and shoe-cushioning means carried by the member.

14. In a truck, a brake-shoe carrier, a block removably secured within the carrier, said block having a lateral opening, a member having a head within said opening and movable pivotally therein, and a brake shoe removably secured to said member, and springs seated within the member for cushioning the shoe.

15. The combination with a car body, trucks therefor, and a brake mechanism carried by each truck, of a lever pivotally supported by the car-body, connections between said lever and the several brake mechanisms, a brake setting rod for the lever, a support for said rod, and means carried by the rod and coöperating with said support for automatically returning the rod to inactive position upon the release of the setting means.

16. The combination with a car body, trucks therefor, and a brake-mechanism carried by each truck, of a lever pivotally supported by the car body, connections between said lever and the several brake mechanisms, a brake setting rod for the lever, a support for said rod, and a spring carried by the rod and coöperating with said support for automatically returning the rod to inactive position upon the release of the setting means.

17. In a truck, a bolster, brackets secured to and projecting from opposite sides thereof, each bracket having horizontal guideways, and a reciprocating brake-shoe carrier mounted within the guide-ways.

18. In a truck, a bolster, brackets, secured to and projecting from opposite sides thereof, each bracket having horizontal guideways, a reciprocating brake-shoe carrier mounted within the guide-ways, and means common to each pair of carriers for imparting reciprocating movements in either direction to the carriers.

19. In a truck, a bolster, brackets secured to and projecting from opposite sides thereof, each bracket having horizontal guideways, a reciprocating brake-shoe carrier mounted within the guide-ways, and a rotatable means common to each pair of carriers for imparting reciprocating movements in either direction to the carriers.

20. In a truck, a bolster, brackets secured to and projecting from opposite sides thereof, each bracket having horizontal guideways, a reciprocating brake-shoe carrier mounted within the guide-ways, and rotatable means carried by the bolster and common to each pair of carriers for imparting reciprocating movements in either direction to the carriers, said latter means having its axis extending in a horizontal plane passing between the brackets.

21. The combination with a car body, trucks therefor, and a brake mechanism carried by each truck, of a lever pivotally supported by the car body, independent connections between said lever and the several brake mechanisms, the pivot point of the lever being positioned relatively to the connecting point of the connections with the lever in such manner as to provide simultaneous movements of the connections in opposite directions, and means for providing movement to said lever, said means comprising a brake setting rod, a support for said rod, and a spring carried by the rod and coöperating with the support for automatically returning the lever and brake mechanism to inoperative position.

In testimony whereof I have hereunto set my hand in presence of two subscribing witnesses.

HENRY W. BLAKE.

Witnesses:
BYRON THURMAN,
ARTHUR THURMAN.